US010670709B2

(12) United States Patent
Ding et al.

(10) Patent No.: US 10,670,709 B2
(45) Date of Patent: Jun. 2, 2020

(54) DRONE LOCALIZATION

(71) Applicant: Intel Corporation, Santa Clara, CA (US)

(72) Inventors: Ke Ding, San Jose, CA (US); Alexander Essaian, Santa Clara, CA (US); Daniel Gurdan, Deutsch (DE); Jun Li, Pleasanton, CA (US); Martin Moerth, Santa Clara, CA (US); Lei Yang, Hillsboro, OR (US); Xue Yang, San Jose, CA (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 16/241,657

(22) Filed: Jan. 7, 2019

(65) Prior Publication Data
US 2019/0212434 A1  Jul. 11, 2019

Related U.S. Application Data

(60) Provisional application No. 62/614,964, filed on Jan. 8, 2018.

(51) Int. Cl.
G01S 13/87 (2006.01)
G01S 5/02 (2010.01)
(Continued)

(52) U.S. Cl.
CPC .......... G01S 13/878 (2013.01); B64C 39/024 (2013.01); G01S 5/02 (2013.01); G01S 5/021 (2013.01); G01S 5/0242 (2013.01); G01S 5/0284 (2013.01); G01S 5/0289 (2013.01); G01S 13/0209 (2013.01); B64C 2201/146 (2013.01)

(58) Field of Classification Search
CPC ...... G01S 13/878; G01S 13/0209; G01S 1/02; G01S 1/024; G01S 5/0284; G01S 5/0289; G01S 1/021; G01S 1/0242; G01S 1/0275; G01S 1/0278; B64C 39/024; H04W 4/021; H04W 4/023; H04W 4/046
See application file for complete search history.

(56) References Cited

U.S. PATENT DOCUMENTS

2009/0212995 A1* 8/2009 Wu ............... G01S 5/0278 342/109
2012/0165012 A1* 6/2012 Fischer ............ G01S 5/0242 455/435.1

(Continued)

Primary Examiner — Magdi Elhag
(74) Attorney, Agent, or Firm — Jaffery Watson Mendonsa & Hamilton LLP

(57) ABSTRACT

A controller comprises a communication interface to receive an anchor localization dataset comprising a plurality of anchor range measurements and a processing circuitry to identify a qualified subset of anchor range measurements from the anchor localization dataset, wherein the anchor range measurements in the qualified subset are consistent, select a first anchor range measurement in the anchor localization dataset from outside the qualified subset of anchor range measurements, and add the first anchor range measurement to the qualified subset of anchor range measurements when the first anchor range measurement is consistent with the anchor range measurements in the qualified subset of anchor range measurements.

18 Claims, 10 Drawing Sheets

(51) Int. Cl.
*G01S 13/02* (2006.01)
*B64C 39/02* (2006.01)

(56) References Cited

U.S. PATENT DOCUMENTS

| | | | |
|---|---|---|---|
| 2012/0231786 A1* | 9/2012 | Ling | G01S 5/0242 |
| | | | 455/424 |
| 2016/0137311 A1* | 5/2016 | Peverill | B64C 39/024 |
| 2017/0195832 A1* | 7/2017 | Santiago | H04B 17/27 |
| 2017/0201858 A1* | 7/2017 | Li | H04W 4/21 |
| 2018/0067191 A1* | 3/2018 | Hamilton | G01S 5/14 |
| 2019/0069263 A1* | 2/2019 | Ylamurto | H04W 64/003 |
| 2019/0257938 A1* | 8/2019 | Yang | G01S 13/878 |

* cited by examiner

DRONE LOCALIZATION

RELATED APPLICATIONS

This application claims the right of priority under 35 U.S.C. § 119(e) of U.S. Provisional Patent Application No. 62/614,964, filed Jan. 8, 2018, entitled TECHNIQUES FOR INDOOR LOCALIZATION, the entire contents of which are incorporated by reference.

BACKGROUND

The subject matter described herein relates generally to the field of electronic devices and more particularly to systems and methods for drone localization.

In recent years, precise and low-latency indoor localization is becoming increasingly important in many application domains, such as indoor drone, sports, robotics and AR/VR. These applications typically require higher location update rate (e.g. >=10 Hz) and higher accuracy (e.g. error in centimeter) than traditional WiFi or GPS based location solutions. Ultra-Wide Band (UWB) radio based localization has a potential to achieve centimeter level location accuracy with lower hardware cost compared to cameras and LIDARs.

In principal, UWB localization utilizes radio signal time-of-flight measurement to estimate the distance between radios and then derive the location. In complex indoor environment, UWB radio signal can experience multipath (where the radio signal received includes direct line of sight signal as well as the reflected signals), obstructions (where there is no direct line of sight signal in received radio signal at all), and channel fading. Under those conditions, the timing measurements of the radio signal can be compromised, and the location accuracy can be degraded. Additionally, hardware measurement errors can also introduce additional errors. Without proper handling of these measurement errors, the UWB localization system can experience significantly degraded accuracy.

A typical localization system requires a number of fixed nodes (i.e., anchors) deployed in the field to serve as location references. The precise locations of those reference anchor nodes need to be known in order to track mobile nodes (e.g., tags) locations. Therefore, substantial deployment efforts are usually carried out in order to calibrate/measure the precise locations of each anchor nodes. Existing location tracking solution providers depend on such manual calibration of anchors nodes (e.g., using LIDAR or laser range finder). Such manual calibration process can take hours or days depending the size of the field. Additionally, such calibration has to be repeated if any anchor location is changed after the initialize setup. Such deployment efforts are non-trivial and present a serious road block for such location systems to be widely adopted by average consumers.

Accordingly, systems and methods to implement drone localization, e.g., in HD mapping for autonomous vehicles.

BRIEF DESCRIPTION OF THE DRAWINGS

The detailed description is described with reference to the accompanying figures.

DETAILED DESCRIPTION

Described herein are examples of systems and methods for drone localization which, in some examples, may be used in indoor environments. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the particular examples.

As described above, precise and low-latency indoor localization is becoming increasingly important in many application domains, such as indoor drone, sports, robotics and AR/VR. Various indoor localization technologies include localization using WiFi, Bluetooth, Lidar or Camera. WiFi and Bluetooth are narrow band radios, localization accuracy is not comparable to UWB. Lidar or Camera based indoor localization solutions are usually expensive and difficult to deploy. By contrast, UWB provides reasonable cost-effective solution to achieve centimeter level location accuracy.

Existing UWB based localization solution cannot sufficiently handle noisy/complex indoor environments where multipath and obstructions are severe. This invention specifically deals with this issue, to provide a robust and accurate indoor location localization solution for such noisy/complex indoor environment.

Other UWB based indoor localization solutions also exist. However, the performance of UWB based indoor localization solutions highly depend on the environment. Existing solutions we are aware work well in environment with direct line-of-sight (no obstructions) between radios with minimal multipath conditions. In complex indoor environment, UWB localization accuracy can be significantly degraded. For example, in airline hangars where the multipath and obstruction conditions are extremely severe, no other UWB localization system has been proved to be working other than our UWB localization system.

Described herein are techniques to perform localization for autonomous vehicles. Subject matter described herein may be used advantageously with autonomous vehicles, such as drones, in indoor environments. As used herein, the term vehicle should be construed broadly to include cars, trucks, ships, aircrafts, spacecrafts, trains, buses or any form of transportation. Further structural and operational details will be described with reference to FIGS. 1-10, below.

Figure 1:
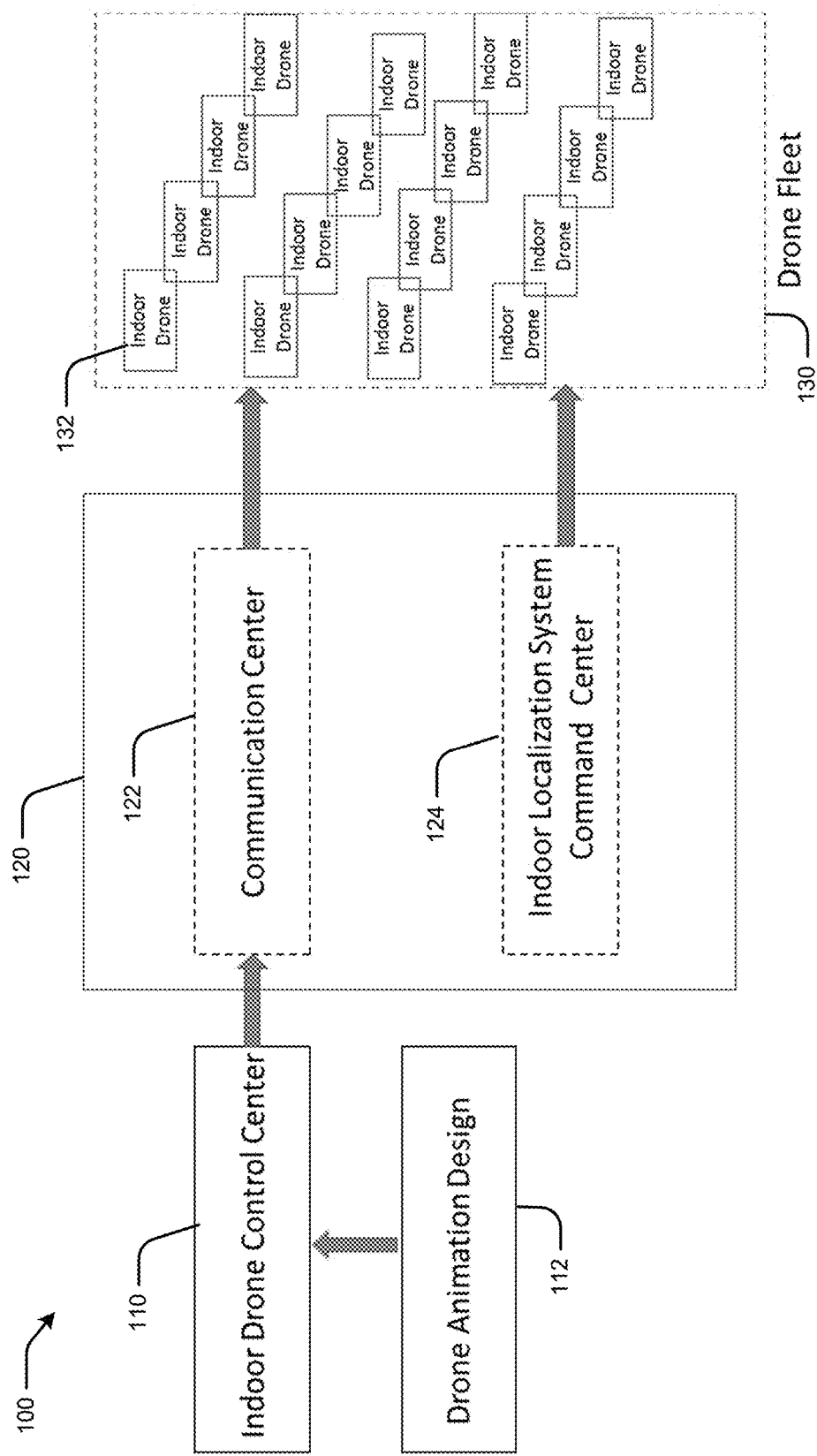
FIG. 1 is a schematic illustration of an environment to implement drone localization, in accordance with some examples.
Figure 2:
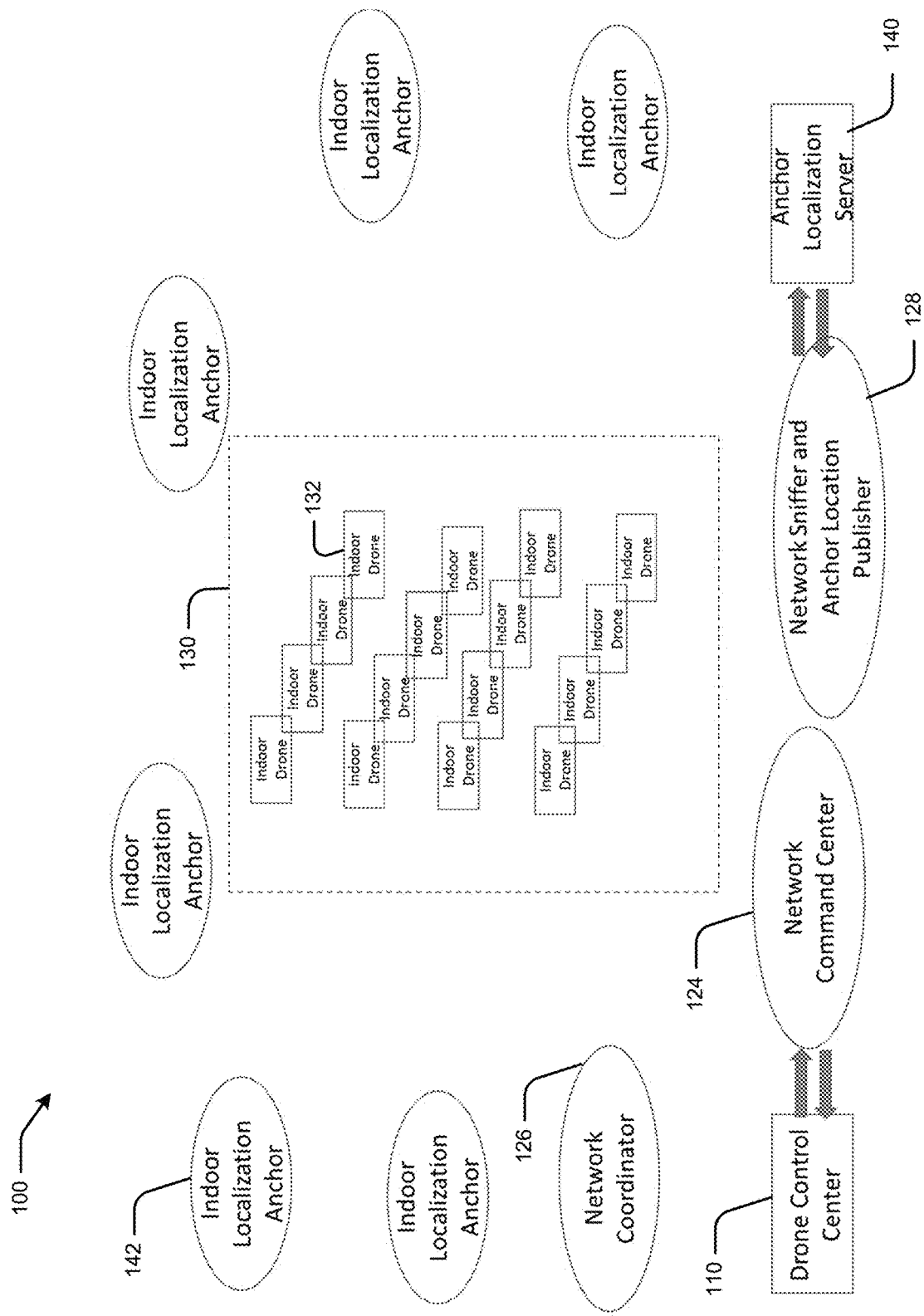
FIG. 2 is a schematic illustration of an environment to implement drone localization, in accordance with some examples.

FIGS. 1-2 are schematic illustrations of an environment 100 to implement drone localization, in accordance with some examples. Referring to FIGS. 1-2, in some examples the environment 100 comprises one or more drone control centers 110 adapted to receive a drone animation design 112. Drone control center 110 is communicatively coupled via network 120 to a communication center 122 and an indoor localization system command center 124. A drone fleet 130 comprising a plurality of drones 132 are communicatively coupled to the communication center 124 and the localization system command center 124 via network 120.

In some examples the drone control center 122 communicates with various drones 132 in the drone fleet to accomplish at least the following tasks. The drone control center 110 transfers a fly animation map in real time to all drones 132, enabling drones 132 to fly any animation. Drone control center 110 transfers firmware update to drones 132, enabling firmware update in real time. Drone control center issues commands to drones 132, including launching, landing, light changes, etc. Drones 132 send their status back to drone control center 110, including battery level, location fix quality, etc.

In some examples network 120 may be embodied as an UWB network provides wireless communication between drone control center 110 and drones 132. UWB network 120 also provides indoor localization for drones 132. Details of the Indoor Localization System will be elaborated in FIG. 2.

Referring to FIG. 2, in some examples one or more localization anchors 142 are to be placed in the environment 100 where indoor drone flights take place. A number of anchors 142 are spatially separated to bound the drone flying 3D space. Those anchors 142 will function as location reference (conceptually similar to indoor satellites), so that each drone 132 can calculate their own locations based on the relative measurements between each drone 132 and each anchor 142.

In some examples anchor positions can be self-calibrated, so there is need to manually measure or survey anchor positions. An anchor localization server 140 may collect relative ranging measurements for each pair of anchors 142 through a network sniffer and anchor location publisher 128, and then apply one or more algorithms to estimate the global topology across all anchors 142. A local location system may be constructed by all anchors 142 after their topology is determined.

In some examples the anchor localization server 140 collects all measurements through network sniffer 128. After the anchor locations are computed, the anchor locations are published to each anchor 128 through the anchor location publisher. The network command center 124 relays the communication traffic between the drone control center 110 and drones 142 as described with reference to in FIG. 1.

Given the knowledge of each anchor's position, each drone 132 may compute its location based on timing measurements relative to the various anchors 142. The system design therefore is scalable in the way that the number of drones 132 is not constrained by communication or localization methods. Therefore, hundreds to thousands of drones 132 can fly with the same system.

Having described various structural components of examples of an architecture for drone localization, operations implemented by the system will be described with reference to FIGS. 3, 4A-4B, and 5.

As described above, existing localization systems require a plurality of fixed nodes (i.e., anchors) deployed in the field to serve as location references. The precise locations of those reference anchor nodes need to be known in order to track mobile nodes (e.g., tags) locations. Therefore, substantial deployment efforts are usually carried out in order to calibrate/measure the precise locations of each anchor nodes. Existing location tracking solution providers depend on such manual calibration of anchors nodes (e.g., using LIDAR or laser range finder). Such manual calibration process can take hours or days depending the size of the field. Additionally, such calibration has to be repeated if any anchor location is changed after the initialize setup. Such deployment efforts are non-trivial and presents a serious road block for such location systems to be widely adopted by average consumers.

In some aspects, subject matter described herein proposes a self-calibration localization system that reduces such deployment burdens. The proposed system can dynamically calibrate anchor locations to remove any manual deployment calibration. In addition, it keeps track of anchor location changes while in use. Using the systems and techniques described herein it is possible to achieve the goal of "Drop And Play"—the entire location system can be deployed in minutes by simply turning on the anchor nodes and dropping them at arbitrary locations on the field. The system will automatically calibrate all anchors node and find their locations, and then starts to locate mobile nodes (i.e., tag). Techniques described herein significantly simplify the location system deployment time and cost compared to existing solution and remove road-blocks for consumer markets.

In some aspects subject matter described herein solves non-linear optimization problems to determine relative topology among anchor nodes given noisy ranging measurements. Given the pair-wise noisy ranging measurements among all anchor nodes, it is possible to first identify the largest subset of anchors 142 in the network whose measurements agree with each other. Using this as baseline, then it is possible to iteratively add additional ranging measurements to localize the remaining anchor nodes.

Thus, deployment burdens are reduced in comparison to with existing solutions. Instead of hours or days of manual calibration process required by existing systems, a system can be deployed in minutes: an operator can simply turn on the anchor nodes and drop them at arbitrary locations on the field (e.g., basketball court, soccer field, hockey field, etc.). The self-calibration system can then be up and running, perform self-calibration among anchors nodes, and then track mobile tags locations.

Figure 3:
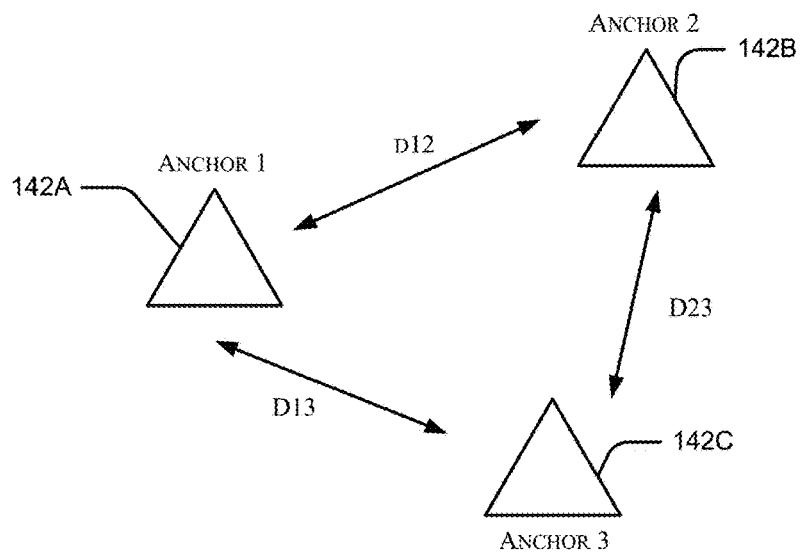
FIG. 3 is a diagram illustrating elements in an architecture to implement drone localization in accordance with some examples.

One component of the technique is the ability for the system to self-calibrate the anchor locations instead of relying manual location tracking. The basic principle of this technique is to perform periodic pair-wise range measurements among anchors 142, and then solve anchor locations as non-linear optimization problem. FIG. 3 is an illustration of an example for 3 anchors (142A, 142B, 142C) on a two-dimensional (2D) plane. A pair-wise range measurement can be performed with two-way-ranging using a UWB radio. Once all three pair-wise ranging measurements are available, the relative locations of these three anchors (142A, 142B, 142C) may be determined, because the triangle defined by anchors (142A, 142B, 142C) is determined when the length of the three edges are known.

This basic principle may be extended to cover additional anchors 142 and three-dimensional (3D) space for systems which comprise a number $N \geq 4$ anchors 142. In some examples, the location system gathers the pair-wise distance between all anchors 142 and then jointly solves the relative anchor position. Given there are $N^2$ pair-wise range measurements available, the relative topology of anchor nodes is over-determined. Therefore, the anchor self-localization problem may be formulated as a non-linear least square optimization problem: given pair-wise anchor distance matrix $D=\{d_{ij}\}$, we would like to find the anchor position $(x_i, y_i, z_i)$ $(i, j=1, 2, \ldots, N)$ that can minimize the following residual error when compared to actual range measurement $d_{ij}$ between anchor i and anchor j.

$$\sum_{i,j} \left( \sqrt{(x_i - x_j)^2 + (y_i - y_j)^2 + (z_i - z_j)^2} - d_{ij} \right)^2 \qquad \text{EQ 1}$$

Using the above formulation, we can solve the relative anchor position. To fix the relative position to a certain coordinate system, we can define the coordinate system based on a few selected anchors. For example, in a 3D space, we can define the coordinate origin (x=0, y=0, z=0) as anchor1, let the anchor1-to-anchor2 line defines the x-axis, and the z=0 horizontal plane can be defined by the plane containing the three anchors (142A, 142B, 142C). Given the coordinate frame definition, each anchor 142 then has its specific location defined relative to the local coordinate frame.

One challenge to be addressed is that, in practical indoor environments, many factors, including multi-path condition, obstructions, moving people and objects, etc., can introduce measurement errors. If the non-linear optimization solver is applied using all available measurement, the non-linear solver typically may not be able to converge in complex indoor environments. An iterative algorithm may be implemented to address this issue. Given N anchors in the network, each anchor has N-1 ranging measurements.

Figure 4A:
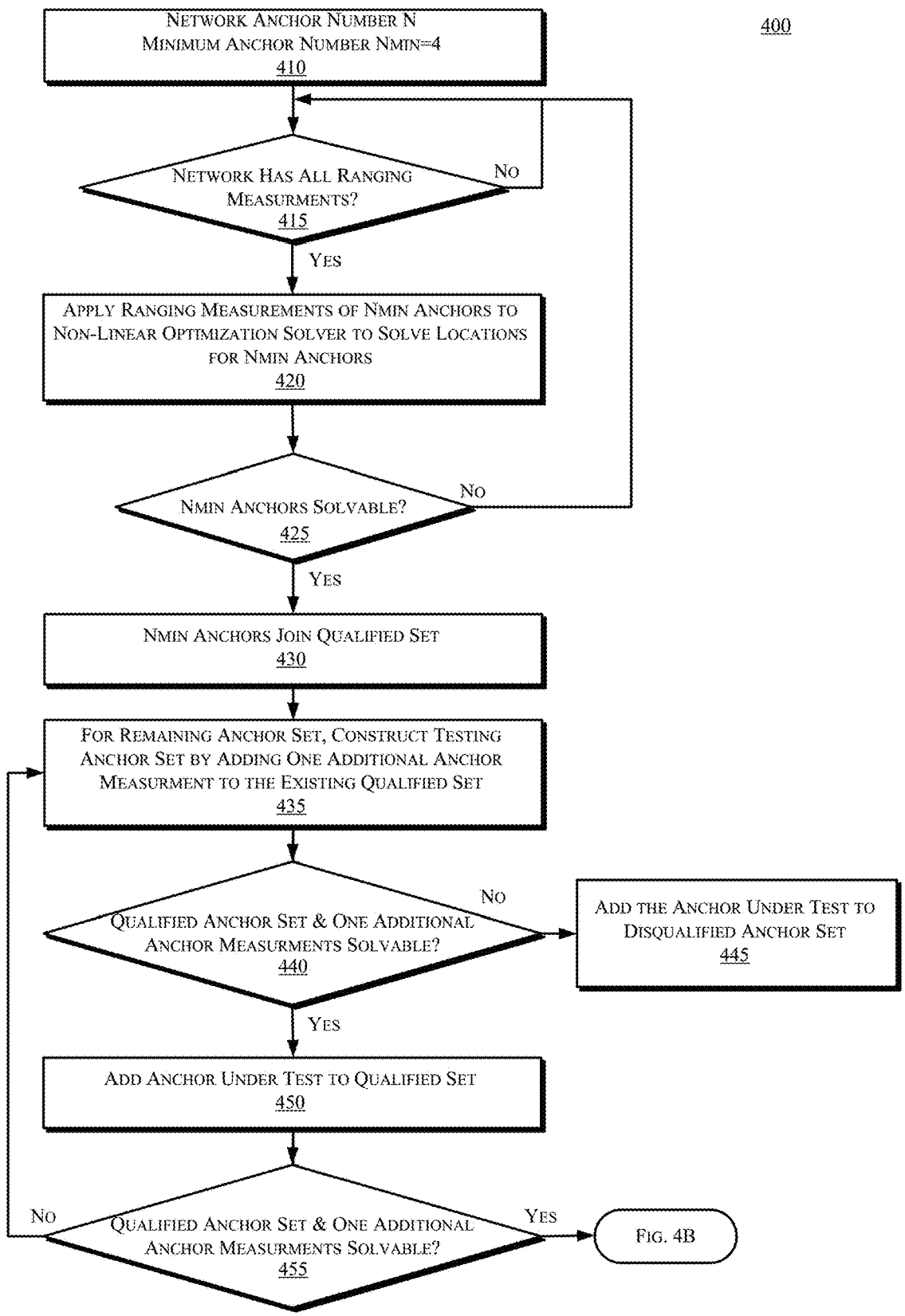
FIGS. 4A-4B are flowcharts illustrating operations in a method to implement drone localization in accordance with some examples.
Figure 4B:
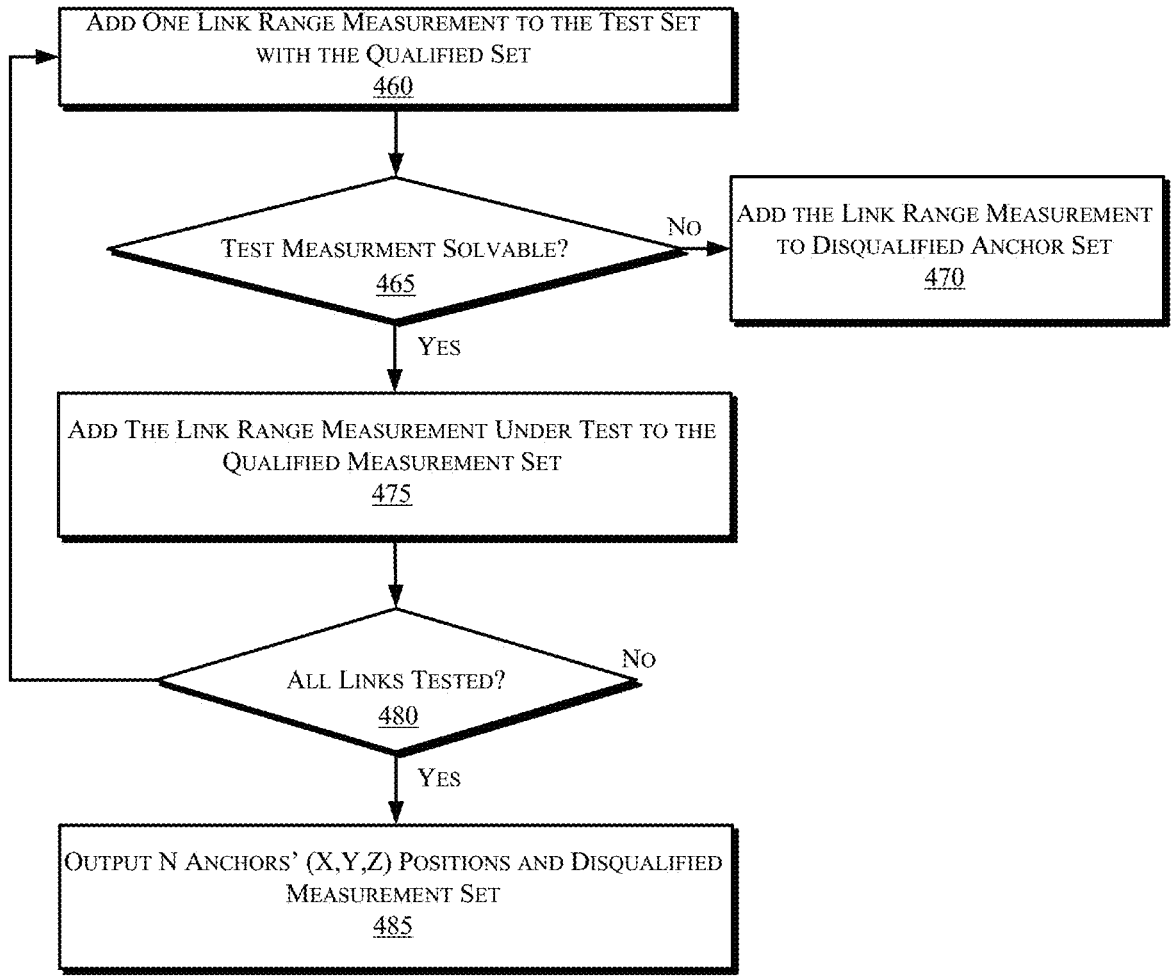

Referring to FIG. 4A, at operation 410, for any network comprising a number, N, anchors 142, the minimum anchor number is four (4). If, at operation 415, the network has all ranging measurements then control passes to operation 420 and the ranging measurements of the Nmin anchors are applied to the non-linear optimization solver to solve locations for the Nmin anchors 142

If, at operation 425, the Nmin anchors are solvable then control passes to operation 430 and the Nmin anchors a subset of K anchors whose measurements agree each other join the "qualified set" of anchors. In other words, all range measurements among those K anchors (i.e., K*(K−1)) agree with each other and the non-linear optimization solver can converge to solve for locations of those K anchors.

At operation 435, for the remaining anchor set, a testing anchor set is constructed by adding one additional anchor measurement to the existing anchor set. For the remaining N−K anchors, each ranging measurement is tested one by one. For a particular anchor, anchor i, there are N−1 ranging measurements from anchor i to anchor 1, 2, i−1, i+1, . . . , N. For each of those ranging measurement, test if the measurement under test agree with the qualified measurement set. If, at operation 440, it agrees with the qualified set, then at operation the specific measurement is added to the qualified anchor set at operation 450. By contrast, if at operation 440 the measurement under test does not agree with the qualified measurement set, then at operation 445 the anchor is added to the disqualified anchor set and the measurement is discarded. As long as there are 4 measurements out of total N−1 measurements for anchor i, the algorithm can sufficiently solve for the location for anchor i.

If, at operation 455, the qualified anchor set and at least one additional anchor measurement are not available then control passes back to operation 435. By contrast, if at operation 455 the qualified anchor set and at least one additional anchor measurement are available then control passes to operation 460 depicted in FIG. 4B.

At operation 460 one link range measurement is added to the test set with the qualified set. If, at operation 465, the test measurement is not solvable, then control passes to operation 470 and the link range measurement is added to the disqualified measurement set. By contrast, if at operation 465 the test measurement is solvable, then control passes to operation 475 and the link range measurement is added to the qualified measurement set.

If, at operation 480, all links have not yet been tested then control passes back to operation 460. By contrast, if at operation 480 all links have been tested then control passes to operation 485 and the algorithm outputs the N anchors respective (x,y,z) positions and the disqualified measurement set.

The system can support self-calibration of any number of nodes (N>=4 for 3-dimensional location tracking, and N>=3 for 2-dimensional location tracking). The networking protocol is designed to support such dynamic network formation and self-calibration to support periodic update of pairwise ranging measurement among anchor nodes. To avoid packet collisions and provide maximal efficiency, a time slot base access protocol that assigns different time slots for each anchor node may be utilized.

As described above, various indoor localization technologies exist. Popular solutions include localization using WiFi, Bluetooth, Lidar or Camera. WiFi and Bluetooth are narrow band radios, localization accuracy is not comparable to UWB. Lidar or Camera based indoor localization solutions are usually expensive and difficult to deploy. In comparison, UWB provides reasonable cost-effective solution to achieve centimeter level location accuracy.

The performance of existing UWB based indoor localization solutions depends on the environment. Existing solutions may work well in environment with direct line-of-sight (no obstructions) between radios with minimal multipath conditions. In complex indoor environments, UWB localization accuracy can be significantly degraded. For example, in airline hangars where the multipath and obstruction conditions are extremely severe, UWB localization systems have encountered difficulties.

In principle, ranging based localization utilizes the distance measurements among multiple devices to compute location. If one of the range measurements is screwed, then location computation will either fail (no location output), or distorted (inaccurate location output). Therefore, properly identifying the bad range measurements amongst all available measurements is crucial. The core of our solution is on how to reliably identify and filter out bad measurements caused by various error factors.

The subject matter described herein can provide robust and accurate indoor localization in complex/noisy indoor environments where existing solutions experience difficulties.

Figure 5:
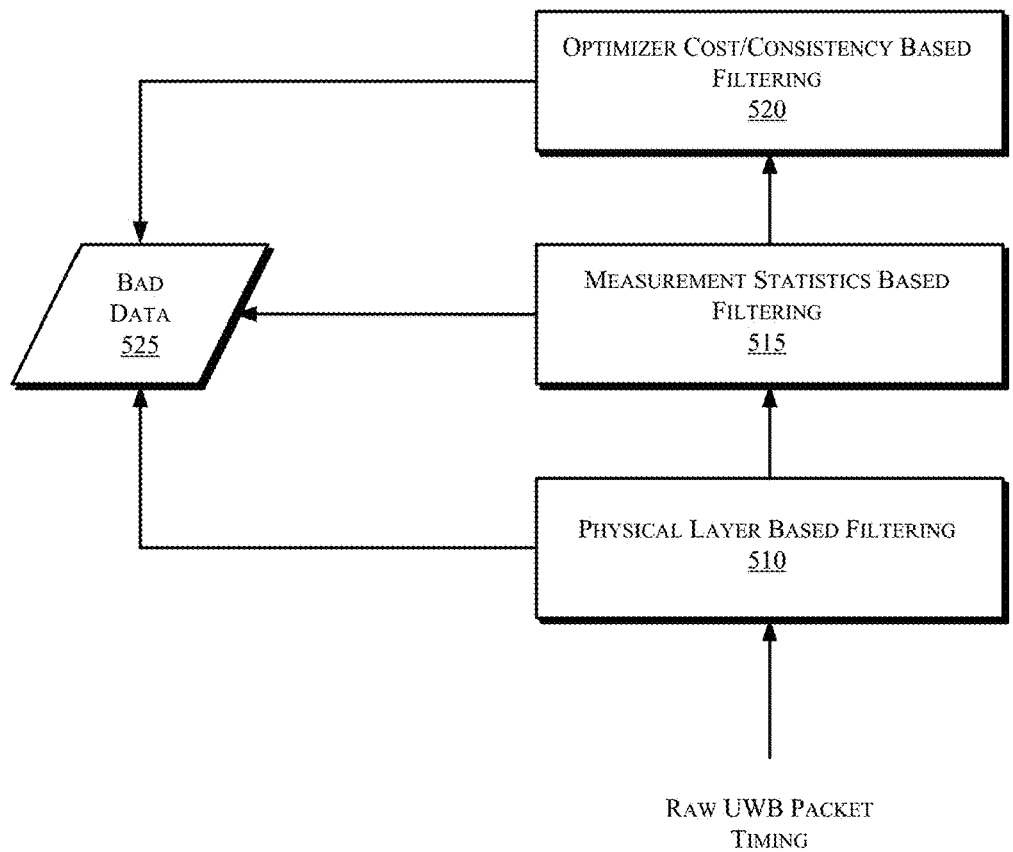
FIG. 5 is a diagram illustrating aspects of drone localization in accordance with some examples.

UWB measurement errors can come from multiple sources, including physical layer radio measurement errors, multipath impact and obstructions, as well as moving people or objects in the environment. Subject matter described herein utilizes a multi-layer filtering solution that can identify and remove various measurement errors to output accurate indoor results. As shown in FIG. 5, UWB packets from UWB physical layer may be filtered (operation 510) measurement statistics (operation 515) and optimizer consistency (operation 520) may be filtered to identify bad measurements.

One common cause of incorrect UWB measurements is bad UWB channel condition, e.g. weak signal or strong multipath. In some examples, the following two criteria to remove first level bad measurements due to bad link quality.

Received Signal Strength (RSSI). If the packet is received with low signal strength, e.g. <−103 dB, consider the packet signal may be considered too weak, where the radio timing measurement may not be trustworthy. The algorithm may discard all measurements that have radio signal RSSI lower than a certain threshold.

The relative ratio between the first path component and the overall signal strength (i.e., First Path Index (FPI)). A typical indoor environment may include a lot of reflective paths. For accurate localization, the timing of the direct line-of-sight path to capture the true physical distance between nodes should be measured. However, if the first-path signal is too weak compared to the overall RSSI, it indicates the presence of stronger reflected path and the range measurement may not be reliable. Measurements may be discarded if their Overall RSSI to First-Path RSSI ratio is larger than a given threshold, e.g. 12 dB.

In addition to bad channel conditions, the UWB radio itself can also introduce measurement errors. For example, preamble sync block can introduce occasional sync errors that lead to packet timing errors. These bad measurements cannot be detected by channel quality indicator discussed previously, and needs to be removed by measurement statistics based filtering. The basic assumption is that most measurements are reliable, and the occasional outliers due to imperfect radio can be found by checking the temporal stability of the measurements.

For accurate localization, UWB radio clock-drift rates may be tracked to maintain at least 300 ps of synchronized clock accuracy among UWB radios. Clock drift rate should be relatively stable over time (e.g. the drift rate change should be less than 0.1 ppm per second). If a certain beacon timing measurement returned by the UWB radio results in larger than expected clock drift rate estimate, this packet timing measurement is not considered reliable and discard the corresponding measurement from location computation may be discarded.

Although the first two layers of filtering can already remove many bad measurements, there are still incorrect measurements that cannot be detected. One example is due to complete obstruction or non-line-of-sight: if there is no direct path between two anchors but only a strong reflected path, the UWB packet timing measurement between the nodes may still have good channel quality and show good stability over time, but the distance estimate would be incorrect. In order to detect such bad measurement, each measurement with the rest of the UWB location system may be examined as a whole. The assumption here is that the majority of the UWB measurements are correct and hence are "consistent" with each other. Only the bad measurements that would be inconsistent with the majority of the UWB measurements. For example, when three UWB radios are used their peer-to-peer distance can be measured. Referring to FIG. 3, for their given positions the distances d12, d13 and d23 should agree with each other. If d23 measurement is too large, then the triangle inequality theorem would be broken. However, assumption may be that the majority of the measurements are correct for a functional system. Therefore, a check for consistency across multiple measurements may be used to identify a specific bad measurement and then remove it from location computation.

In one example it may be assumed that, given the previous location estimate of a specific UWB radio, the new measurement due to its movement should be consistent with the received timing measurements at all other UWB radios. If some UWB radios have incorrected timestamps, the residue error from actual measurement to the location estimate would be much larger than the rest of the UWB radios. In such cases, a simple median filter may be used to estimate the majority residue error. Then, error detection threshold may be applied to identify any measurement that has a larger residue error than the majority residue error, which may be discarded from location computation.

Figure 6:
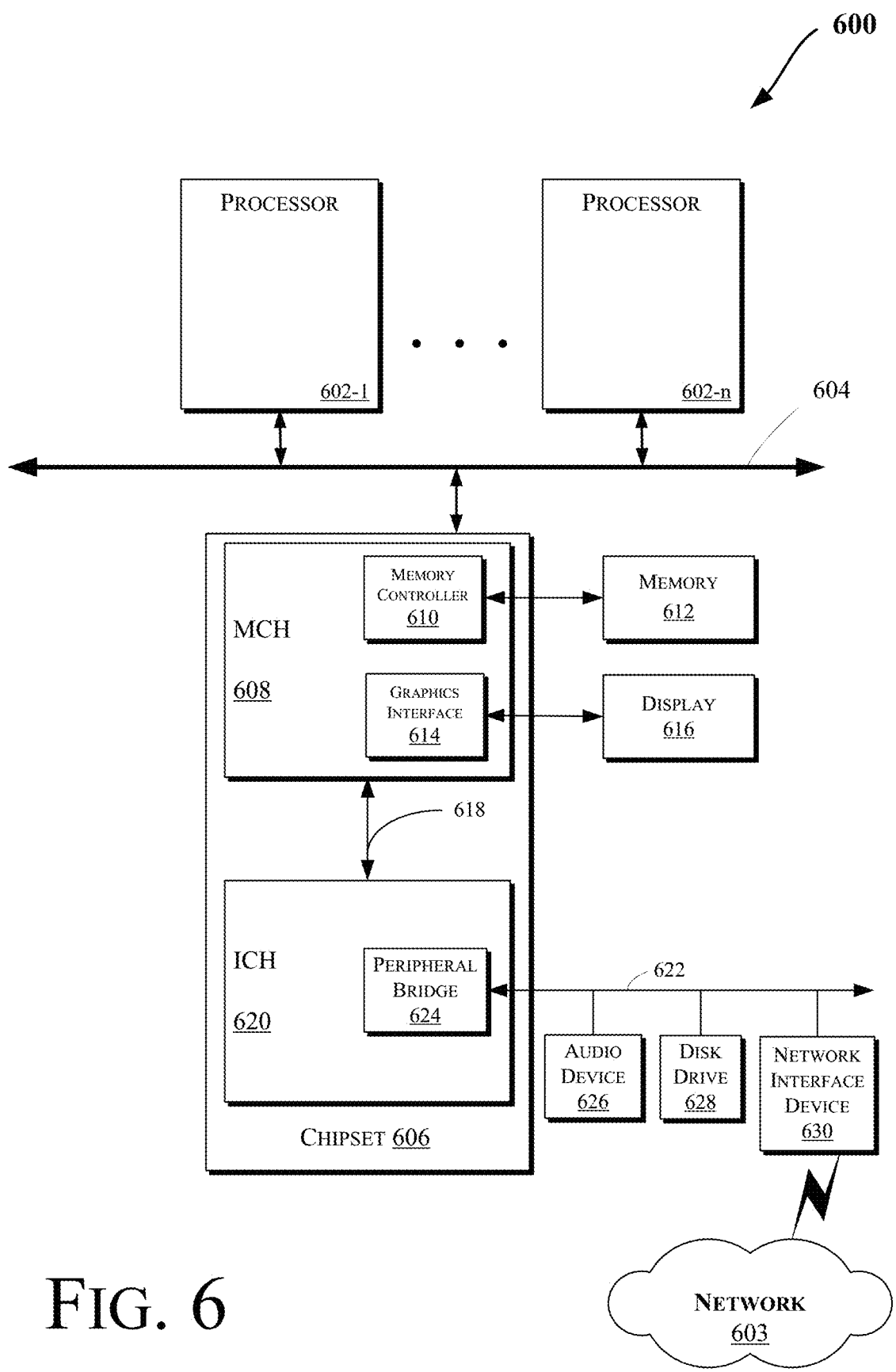
FIGS. 6-10 are schematic illustrations of electronic devices which may be adapted for use in fast lidar data classification for autonomous vehicles in accordance with some examples.

Thus, described herein are examples of post-incident management autonomous vehicles. As described above, in some examples the controller 230 and may be embodied as a computer system. FIG. 6 illustrates a block diagram of a computing system 600 in accordance with an example. The computing system 600 may include one or more central processing unit(s) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors.

A chipset 606 may also communicate with the interconnection network 604. The chipset 606 may include a memory control hub (MCH) 608. The MCH 608 may include a memory controller 610 that communicates with a memory 612. The memory 412 may store data, including sequences of instructions, that may be executed by the processor 602, or any other device included in the computing system 600. In one example, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple processor(s) and/or multiple system memories.

The MCH 608 may also include a graphics interface 614 that communicates with a display device 616. In one example, the graphics interface 614 may communicate with the display device 616 via an accelerated graphics port (AGP). In an example, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the processor 602 and peripheral devices. Other types of topologies may be utilized. Also, multiple buses may communicate with the ICH 620, e.g., through multiple bridges or controllers. Moreover, other peripherals in communication with the ICH 620 may include, in various examples, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some examples. In addition, the processor 602 and one or more other components discussed herein may be combined to form a single chip (e.g., to provide a System on Chip (SOC)). Furthermore, the graphics accelerator 616 may be included within the MCH 608 in other examples.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
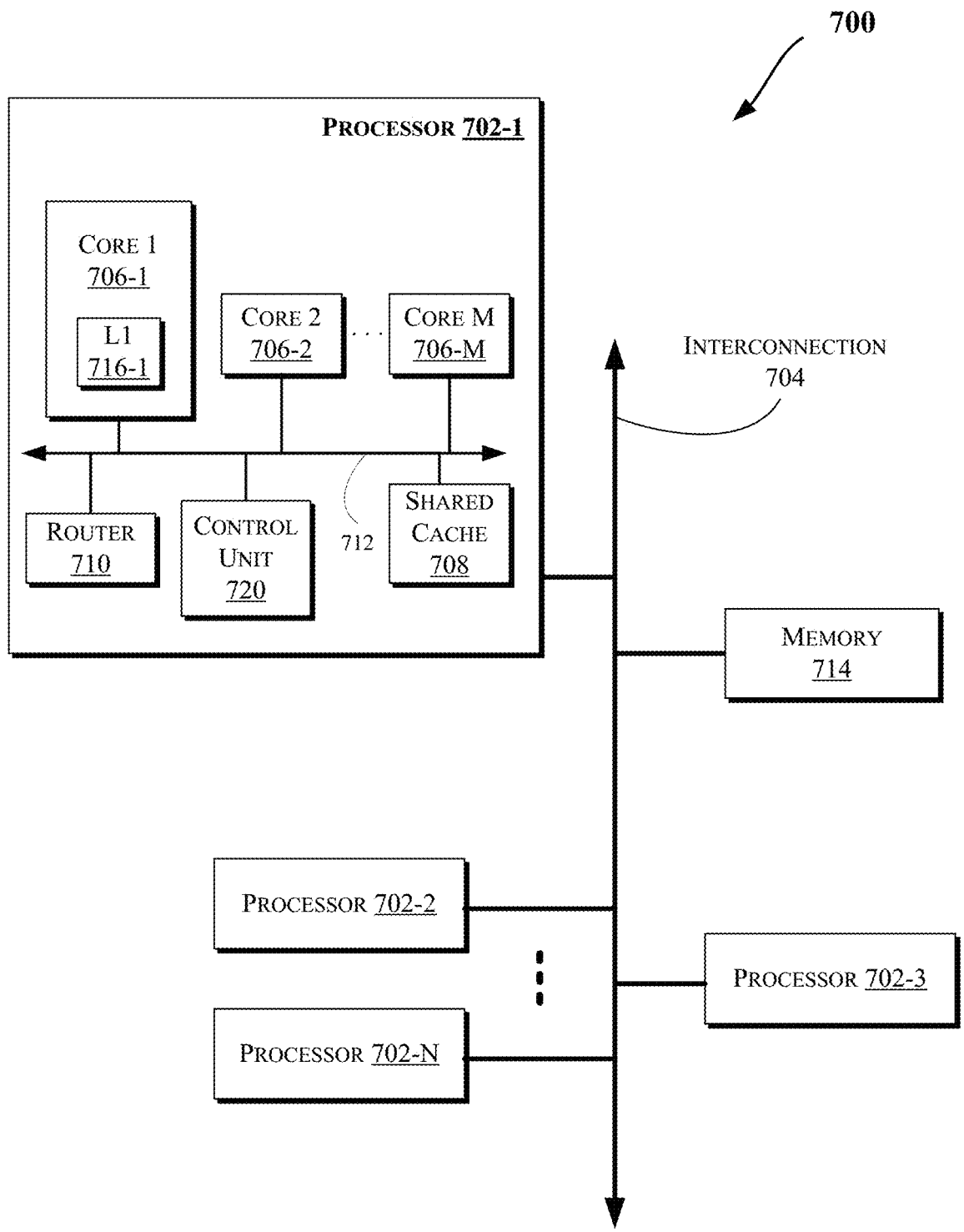

FIG. 7 illustrates a block diagram of a computing system 700, according to an example. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an example, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one example, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an example, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some examples, one or more of the cores 706 may include a level 1 (L1) cache 716-1 (generally referred to herein as "L1 cache 716").

Figure 8:
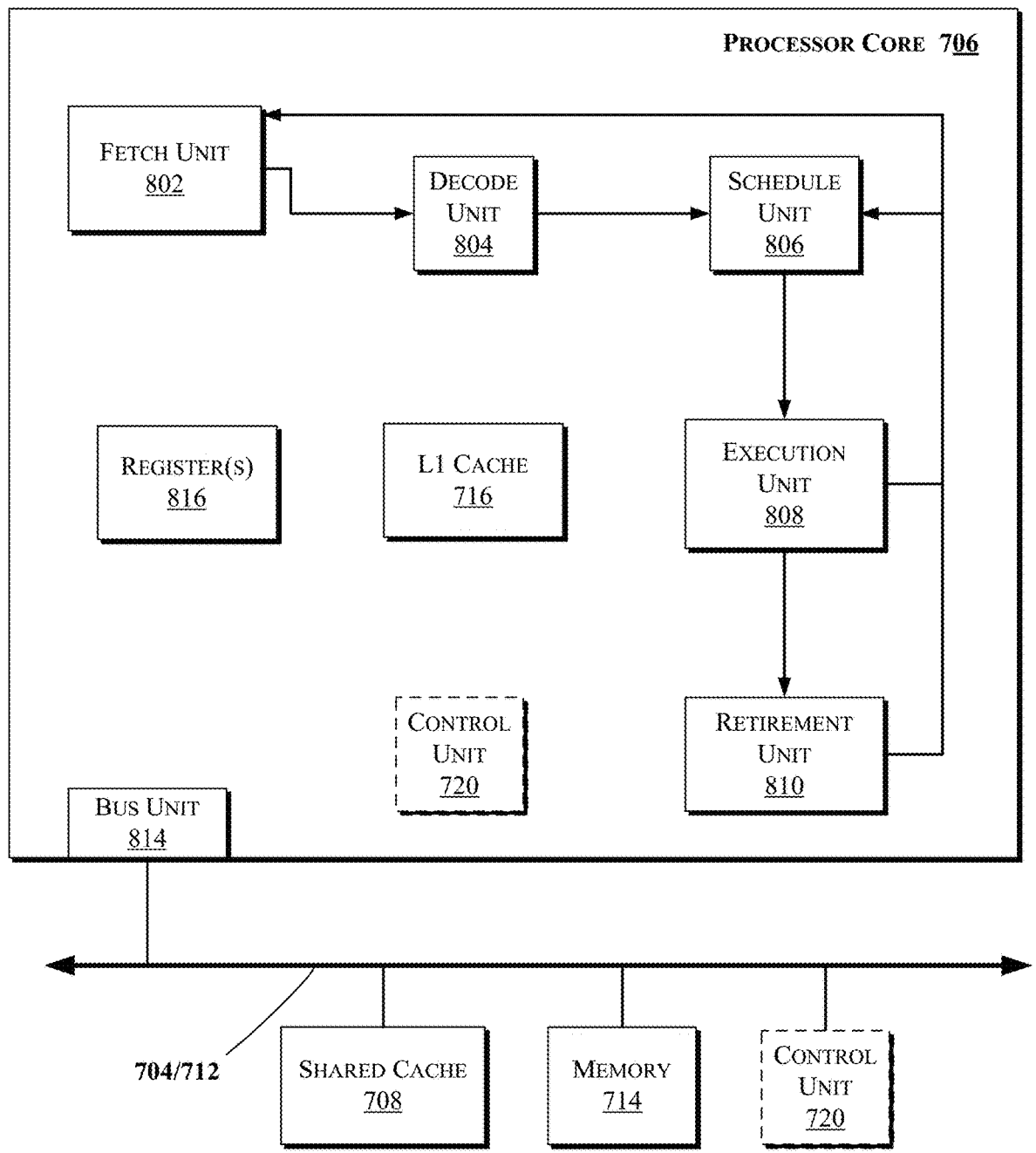

FIG. 8 illustrates a block diagram of portions of a processor core 706 and other components of a computing system, according to an example. In one example, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one example, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an example, the execution unit 808 may include more than one execution unit. The execution unit 808 may also perform various arithmetic operations such as addition, subtraction, multiplication, and/or division, and may include one or more an arithmetic logic units (ALUs). In an example, a co-processor (not shown) may perform various arithmetic operations in conjunction with the execution unit 808.

Further, the execution unit 808 may execute instructions out-of-order. Hence, the processor core 706 may be an out-of-order processor core in one example. The core 706 may also include a retirement unit 810. The retirement unit 810 may retire executed instructions after they are committed. In an example, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various examples the control unit 720 may be located elsewhere such as inside the core 706, coupled to the core via bus 704, etc.

Figure 9:
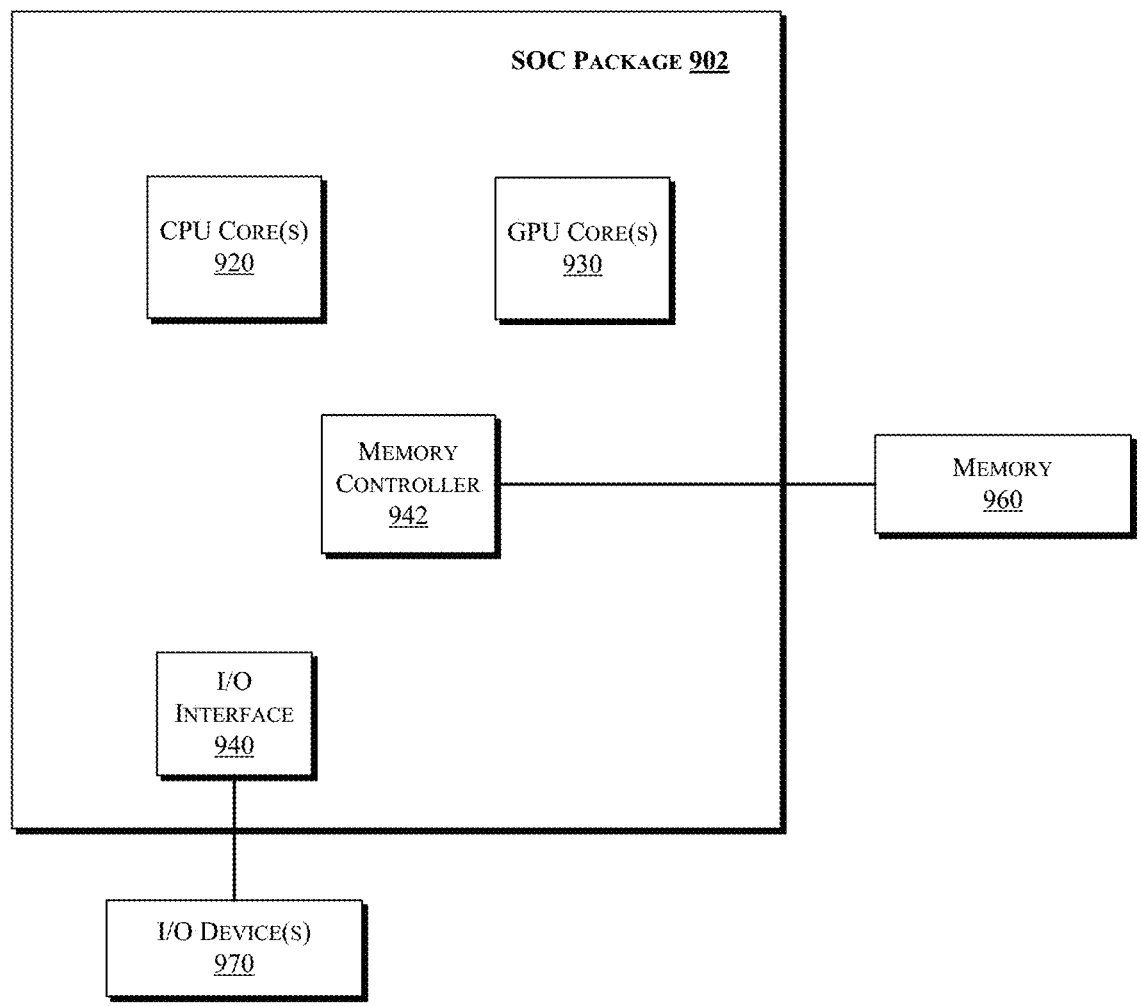

In some examples, one or more of the components discussed herein can be embodied as a System On Chip (SOC) device. FIG. 9 illustrates a block diagram of an SOC package in accordance with an example. As illustrated in FIG. 9, SOC 902 includes one or more processor cores 920, one or more graphics processor cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one example, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an example, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device (s) 970 may include one or more of a keyboard, a mouse, a touchpad, a display, an image/video capture device (such as a camera or camcorder/video recorder), a touch surface, a speaker, or the like.

Figure 10:
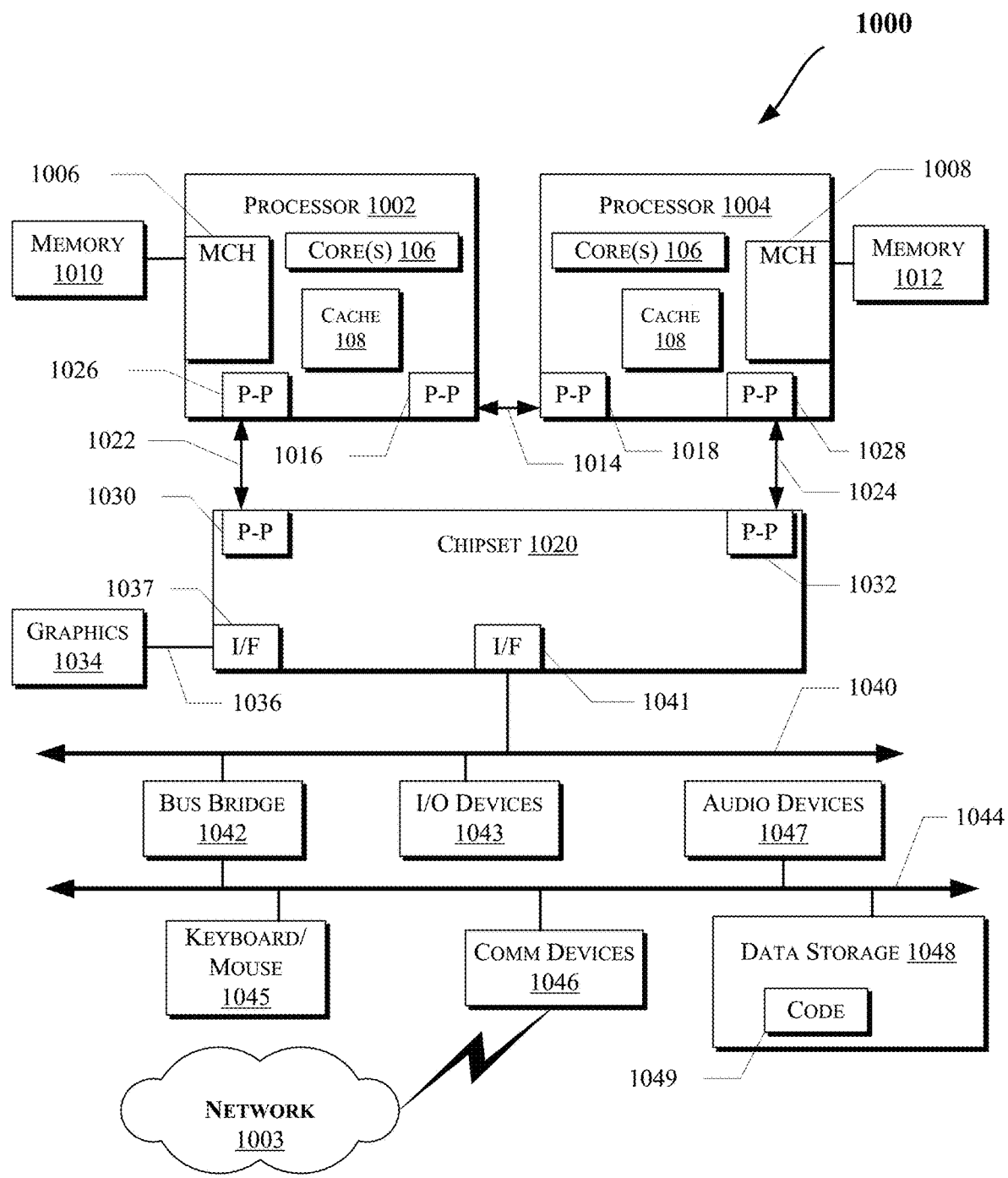

FIG. 10 illustrates a computing system 1000 that is arranged in a point-to-point (PtP) configuration, according to an example. In particular, FIG. 10 shows a system where processors, memory, and input/output devices are interconnected by a number of point-to-point interfaces. As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012.

In an example, the processors 1002 and 1004 may be one of the processors 702 discussed with reference to FIG. 7. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

The chipset 1020 may communicate with a bus 1040 using a PtP interface circuit 1041. The bus 1040 may have one or more devices that communicate with it, such as a bus bridge 1042 and I/O devices 1043. Via a bus 1044, the bus bridge 1043 may communicate with other devices such as a keyboard/mouse 1045, communication devices 1046 (such as modems, network interface devices, or other communication devices that may communicate with the computer network 1003), audio I/O device, and/or a data storage device 1048. The data storage device 1048 (which may be a hard disk drive or a NAND flash based solid state drive) may store code 1049 that may be executed by the processors 1004.

The following pertains to further examples.

Example 1 is a controller comprising a communication interface to receive an anchor localization dataset comprising a plurality of anchor range measurements; and a processing circuitry to identify a qualified subset of anchor range measurements from the anchor localization dataset, wherein the anchor range measurements in the qualified subset are consistent; select a first anchor range measurement in the anchor localization dataset from outside the qualified subset of anchor range measurements; and add the first anchor range measurement to the qualified subset of anchor range measurements when the first anchor range measurement is consistent with the anchor range measurements in the qualified subset of anchor range measurements.

In Example 2, the subject matter of Example 1 can optionally include processing circuitry to determine a relative distance between a plurality of anchors represented by the qualified subset of anchor range measurement.

In Example 3, the subject matter of any one of Examples 1-2 can optionally include processing circuitry to define a coordinate system in three-dimensional space using at least three of the anchors.

In Example 4, the subject matter of any one of Examples 1-3 can optionally include processing circuitry to repeatedly select a second anchor range measurement in the anchor localization dataset from outside the qualified subset of anchor range measurements; and add the second anchor range measurement to the qualified subset of anchor range measurements when the second anchor range measurement is consistent with the anchor range measurements in the qualified subset of anchor range measurements.

In Example 5, the subject matter of any one of Examples 1-4 can optionally include processing circuitry to generate a location data set comprising an (x,y,z) coordinate location for each of the anchors represented by the qualified subset of anchor range measurement.

In Example 6, the subject matter of any one of Examples 1-5 can optionally include processing circuitry to store the location data set in a computer readable memory communicatively coupled to the processing circuitry.

Example 7 is an electronic device comprising a computer readable memory, a communication interface to receive an anchor localization dataset comprising a plurality of anchor range measurements; and a processing circuitry to identify a qualified subset of anchor range measurements from the anchor localization dataset, wherein the anchor range measurements in the qualified subset are consistent; select a first anchor range measurement in the anchor localization dataset from outside the qualified subset of anchor range measurements; and add the first anchor range measurement to the qualified subset of anchor range measurements when the first anchor range measurement is consistent with the anchor range measurements in the qualified subset of anchor range measurements.

In Example 8, the subject matter Example 7 can optionally include processing circuitry to determine a relative distance between a plurality of anchors represented by the qualified subset of anchor range measurement.

In Example 9, the subject matter of any one of Examples 7-8 can optionally include processing circuitry to define a coordinate system in three-dimensional space using at least three of the anchors.

In Example 10, the subject matter of any one of Examples 7-9 can optionally include processing circuitry to repeatedly select a second anchor range measurement in the anchor localization dataset from outside the qualified subset of anchor range measurements; and add the second anchor range measurement to the qualified subset of anchor range measurements when the second anchor range measurement is consistent with the anchor range measurements in the qualified subset of anchor range measurements.

In Example 11, the subject matter of any one of Examples 7-10 can optionally include processing circuitry to generate a location data set comprising an (x,y,z) coordinate location for each of the anchors represented by the qualified subset of anchor range measurement.

In Example 12, the subject matter of any one of Examples 7-11 can optionally include processing circuitry to store the location data set in a computer readable memory communicatively coupled to the processing circuitry.

Example 13, is a non-transitory machine readable medium comprising logic instructions which, when executed by a controller, configure the controller to receive an anchor localization dataset comprising a plurality of anchor range measurements; identify a qualified subset of anchor range measurements from the anchor localization dataset, wherein the anchor range measurements in the qualified subset are consistent; select a first anchor range measurement in the anchor localization dataset from outside the qualified subset of anchor range measurements; and add the first anchor range measurement to the qualified subset of anchor range measurements when the first anchor range measurement is consistent with the anchor range measurements in the qualified subset of anchor range measurements In Example 14, the subject matter of Example 13 can optionally include an arrangement to determine a relative distance between a plurality of anchors represented by the qualified subset of anchor range measurement.

In Example 15, the subject matter of any one of Examples 13-14 can optionally include an arrangement to define a coordinate system in three-dimensional space using at least three of the anchors.

In Example 16, the subject matter of any one of Examples 13-15 can optionally include an arrangement to repeatedly select a second anchor range measurement in the anchor localization dataset from outside the qualified subset of anchor range measurements; and add the second anchor range measurement to the qualified subset of anchor range measurements when the second anchor range measurement is consistent with the anchor range measurements in the qualified subset of anchor range measurements.

In Example 17, the subject matter of any one of Examples 13-16 can optionally include processing circuitry to generate a location data set comprising an (x,y,z) coordinate location for each of the anchors represented by the qualified subset of anchor range measurement.

In Example 18, the subject matter of any one of Examples 13-17 can optionally include an arrangement to store the location data set in a computer readable memory communicatively coupled to the processing circuitry.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A controller comprising:
   a communication interface to receive an anchor localization dataset comprising a plurality of anchor range measurements; and
   a processing circuitry to:
      select a minimum number of anchors of a wireless network;
      obtain ranging measurements for the anchors of the wireless network from the anchor localization dataset;
      apply a non-linear optimization algorithm to identify a qualified subset of anchor range measurements from the anchor localization dataset, wherein the anchor range measurements in the qualified subset allow the non-linear optimization algorithm to converge to a solution;
      select a first anchor range measurement in the anchor localization dataset from outside the qualified subset of anchor range measurements; and
      add the first anchor range measurement to the qualified subset of anchor range measurements when the first anchor range measurement allows the non-linear optimization algorithm to converge to a solution when applied with the anchor range measurements in the qualified subset of anchor range measurements.

2. The controller of claim 1, the processing circuitry to: determine a relative distance between a plurality of anchors represented by the qualified subset of anchor range measurement.

3. The controller of claim 2, the processing circuitry to: define a coordinate system in three-dimensional space using at least three of the anchors.

4. The controller of claim 3, the processing circuitry to repeatedly:
select a second anchor range measurement in the anchor localization dataset from outside the qualified subset of anchor range measurements; and
add the second anchor range measurement to the qualified subset of anchor range measurements when the second anchor range measurement is consistent with the anchor range measurements in the qualified subset of anchor range measurements.

5. The controller of claim 4, the processing circuitry to: generate a location data set comprising an (x,y,z) coordinate location for each of the anchors represented by the qualified subset of anchor range measurement.

6. The controller of claim 3, the processing circuitry to: store the location data set in a computer readable memory communicatively coupled to the processing circuitry.

7. An electronic device, comprising:
a computer readable memory;
a communication interface to receive an anchor localization dataset comprising a plurality of anchor range measurements; and
a processing circuitry to:
select a minimum number of anchors of a wireless network;
obtain ranging measurements for the anchors of the wireless network from the anchor localization dataset;
apply a non-linear optimization algorithm to identify a qualified subset of anchor range measurements from the anchor localization dataset, wherein the anchor range measurements in the qualified subset allow the non-linear optimization algorithm to converge to a solution;
select a first anchor range measurement in the anchor localization dataset from outside the qualified subset of anchor range measurements; and
add the first anchor range measurement to the qualified subset of anchor range measurements when the first anchor range measurement allows the non-linear optimization algorithm to converge to a solution when applied with the anchor range measurements in the qualified subset of anchor range measurements.

8. The electronic device of claim 7, the processing circuitry to:
determine a relative distance between a plurality of anchors represented by the qualified subset of anchor range measurement.

9. The electronic device of claim 8, the processing circuitry to:
define a coordinate system in three-dimensional space using at least three of the anchors.

10. The electronic device of claim 9, the processing circuitry to repeatedly:
select a second anchor range measurement in the anchor localization dataset from outside the qualified subset of anchor range measurements; and
add the second anchor range measurement to the qualified subset of anchor range measurements when the second anchor range measurement is consistent with the anchor range measurements in the qualified subset of anchor range measurements.

11. The electronic device of claim 10, the processing circuitry to:
generate a location data set comprising an (x,y,z) coordinate location for each of the anchors represented by the qualified subset of anchor range measurement.

12. The electronic device of claim 9, the processing circuitry to:
store the location data set in a computer readable memory communicatively coupled to the processing circuitry.

13. A non-transitory computer readable medium comprising logic instructions which, when executed by a processor, configure the processor to:
select a minimum number of anchors of a wireless network;
obtain ranging measurements for the anchors of the wireless network from the anchor localization dataset;
apply a non-linear optimization algorithm to identify a qualified subset of anchor range measurements from the anchor localization dataset, wherein the anchor range measurements in the qualified subset allow the non-linear optimization algorithm to converge to a solution;
select a first anchor range measurement in the anchor localization dataset from outside the qualified subset of anchor range measurements; and
add the first anchor range measurement to the qualified subset of anchor range measurements when the first anchor range measurement allows the non-linear optimization algorithm to converge to a solution when applied with the anchor range measurements in the qualified subset of anchor range measurements.

14. The non-transitory computer readable medium of claim 13, the logic instructions to configure the processor to:
determine a relative distance between a plurality of anchors represented by the qualified subset of anchor range measurement.

15. The non-transitory computer readable medium of claim 14, the logic instruction to configure the processor to:
define a coordinate system in three-dimensional space using at least three of the anchors.

16. The non-transitory computer readable medium of claim 15, the logic instructions to configure the processor to repeatedly:
select a second anchor range measurement in the anchor localization dataset from outside the qualified subset of anchor range measurements; and
add the second anchor range measurement to the qualified subset of anchor range measurements when the second anchor range measurement is consistent with the anchor range measurements in the qualified subset of anchor range measurements.

17. The non-transitory computer readable medium of claim 16, the logic instructions to configure the processor to:
generate a location data set comprising an (x,y,z) coordinate location for each of the anchors represented by the qualified subset of anchor range measurement.

18. The non-transitory computer readable medium of claim 15, the logic instructions to configure the processor to:

store the location data set in a computer readable memory communicatively coupled to the processing circuitry.

* * * * *